May 13, 1958     W. H. BACHMANN     2,834,115
DIAL INDICATOR MECHANISM
Filed July 22, 1953
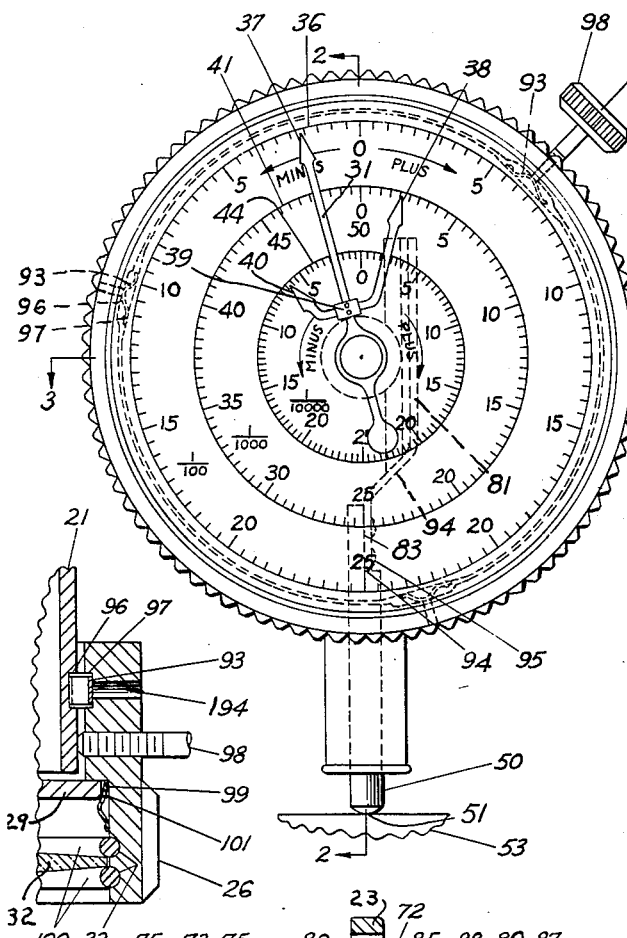
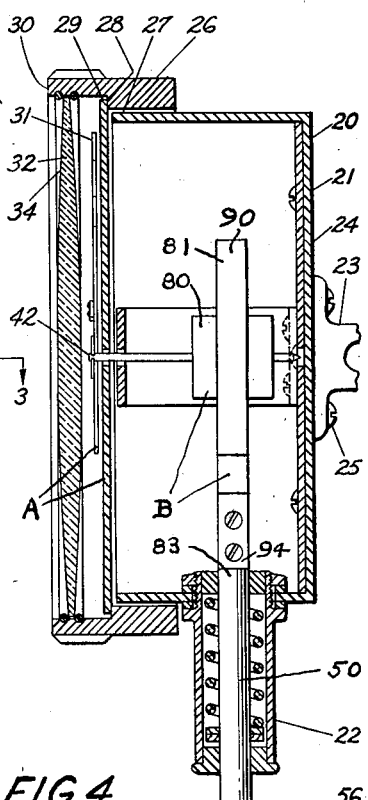
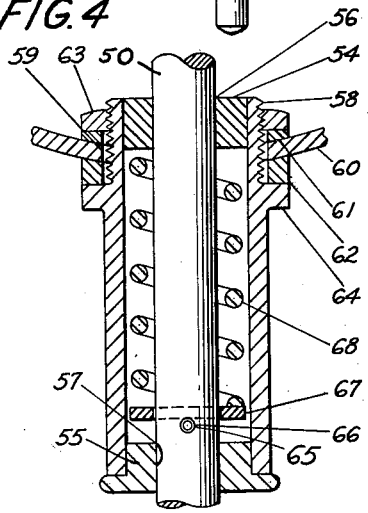
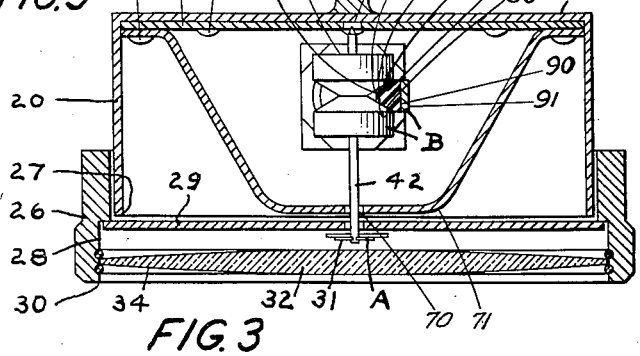
INVENTOR.
WALTER H. BACHMANN
BY Pearson + Pearson
ATTORNEYS

United States Patent Office 2,834,115
Patented May 13, 1958

2,834,115

DIAL INDICATOR MECHANISM

Walter H. Bachmann, Athol, Mass.

Application July 22, 1953, Serial No. 369,609

4 Claims. (Cl. 33—172)

This invention relates to dial indicators used in the tool and machine industry for determining the trueness of moving work and securing a visual indication of any variations from the desired measurements of the work. Heretofore dial indicators much used in the industry have includued a cylindrical body with a rotatable dial, a needle and needle shaft, an anvil or contact point, and a gear rack and pinion connection between the anvil element and the needle elements. A train of gears, hair springs, jewel bearings and other refinements are usually included in the mechanism for converting the rectilinear motion of the anvil into rotary motion of the needle shaft and the teeth of the gear rack and pinion, as well as the other gears, have been precision cut at considerable expense.

Upon sudden impact to the dial indicator such as by accidentally dropping the indicator on the floor or by the anvil bumping against a very uneven and rapidly moving work surface the precision mechanism of such dial indicators has been ruined with the gear teeth stripped, jewel bearings damaged, and costly replacement of parts made necessary. In the more expensive dial indicators, therefore, various shock absorbing mechanisms have been provided such as a coil spring and telescoping tubes between the anvil and the gear teeth to take up sudden shocks received by the anvil. However, such devices not only add to the cost of the indicator but they are not always effective since the shock absorbing spring still tends to transmit a portion of an impact directly on the anvil to the gear mechanism and offers no protection to the delicate mechanism when the sudden impact is on other portions of the dial indicator.

The principal object of my inventon is to provide a dial indicator of low cost and rugged construction which will indicate variations from the true in moving work, and will not be damaged by any sudden impact.

A further object of the invention is to provide a dial indicator in which there are no train of gears, no gear teeth and no hair springs to become damaged by sudden impact and wherein a resilient member preferably of rubber and flat spring metal, forms the only contact between the work contacting member and the visual indication means.

Still another object of the invention is to provide a dial indicator of a diameter about equal to those now in use but having a row of fine graduations on its dial and an inset magnifying lens of nonfrangible material for magnifying the fine graduations.

Other objects of the invention will be apparent in the following description of a preferred embodiment of the device with reference to the drawing in which Fig. 1 is a front elevation of the invention showing in dotted lines, the motion transmitting mechanism thereof.

Fig. 2 is a side elevation, in section on line 2—2 of Fig. 1, of the device shown in Fig. 1.

Fig. 3 is a plan view, in section on line 3—3 of Fig. 1 of the device.

Fig. 4 is an enlarged fragmentary front elevation of the tubular stem and contact rod portion of the indicator, and Fig. 5 is an enlarged fragmentary view similar to Figs. 2 and 4 showing the preferred mechanism for mounting the dial, bezel and lens of the invention.

In the drawing, the portable gauge 20, commonly known as a dial indicator, includes a hollow, cylindrical body member 21 with a tubular stem 22 which may be die cast integral with body 21 or preferably both body and stem are separately formed of sheet metal in any well known manner and the stem 22 removably attached to the body 21. A lug 23 is preferably fixed to the back wall 24 of body 21 by screws such as 25 and may be of any desired shape such as that shown, or in the form of a cylindrical post to form a suitable support for the indicator when desired.

An exteriorly knurled or serrated annular member 26 extends circumferentially around the body member 21 and is usually termed a bezel. It is preferably made by a die casting with integral peripheral serrations. In this invention, the bezel 26 is mounted to be manually rotated around the front edge portion 27 of body 21 and is interiorly grooved at 28 to accomodate the dial 29. Dial 29 is in a plane considerably inset from the plane of the front edge 30 of bezel 26 to provide space for the rotation of a needle 31 and to permit the plane of a magnifying lens 32 to also be slightly inset from edge 30. Thus the exposed surface 34 of lens 32 is not subject to scratches which might obscure its transparency and is protected by edge 30 from accidental impacts tending to break the lens. Lens 32 is preferably of nonfrangible material such as a plastic of the type of "Lucite" and is therefore relatively unbreakable. Lens 32 is designed and arranged to rotate with dial 29, to position the zero on the dial at any desired point of rest of needle 31 and to magnify any fine graduations on the dial to ordinary readable size.

The visual indication means A of this invetnion includes the dial 29 and the narrow, elongated needle 31, the dial having a closed circular line 36 of visual indications in the path of the pointer 37 of needle 31 and divided into equally spaced graduations such for example as 1/100 inch apart. Means A also includes at least one other pointer such as 38, attached to needle 31 at 39 and preferably a third pointer 40 also attached to needle 31 as at 39. Pointers 38 and 39 are laterally spaced as well as longitudinally spaced from pointer 37 of needle 31 in order not to obscure the dial. Also included in means A is at least one other circular or arcuate line 41 of visual indications, concentric with line 36, and with needle shaft 42, and in the path of pointer 38 of needle 31. Line 41 may be divided into equally spaced graduations such for example as 1/1000 of an inch or spaces of any other desired size. A third circular line 44 of visual indications, concentric with lines 36 and 41, is provided in the path of the third pointer 40 which may be divided into graduations of a third size such as 1/10,000 of an inch. The zeros of each line 36, 41 and 44 may be radially aligned, if desired, or unaligned since the dial is rotatable to move the zero of the line intended to be used under the needle 31 to give only minus readings or both minus and plus readings.

A contact rod 50 having a contact point 51, or anvil, is slidably mounted within stem 22 whereby the rod 50 will move in a straight line, perpendicular to the axis or body 20 and to needle shaft 42, when the point 51 is subject to various pressures from the moving work such as 53. As best shown in Fig. 4, the stem 22 is a hollow cylindrical tube and is provided with upper and lower plugs 54 and 55, each having a circular hole 56 and 57 in which the circular rod 50 is supported and is slidable. The upper portion 58 of stem 22 is exteriorly threaded and is inserted in a hole 59 in the circumferential well 60 of body 21. A pair of shaped washers 61 and 62 are provided to conform to the shape of the interior and exterior of wall 60 and a flange 64 and a lock nut 63 are also provided to firmly position stem 22 relative to body 20. A transversely extending pin 65 passes through a hole 66 in rod 50 to support a washer 67, whereby a coil spring 68, encircling rod 50, tends to resiliently urge the anvil or contact point 51, into contact with the work.

Needle shaft 42 is supported in jewel bearings 70 in a V-shaped bridge member 71 and in jewel bearings 72 in the centre of the circular back plate 73 which carries bridge member 71. Suitable screws 75 are provided to attach the member 71 to the back plate 73 and to attach the back plate 73 to the rear wall 24 of body 20.

The motion conversion means B of the invention includes a smooth, friction faced, pulley 80 fixed intermediate of bearings 70 and 72 on needle shaft 42 and a substantially straight smooth, friction faced, propulsion rod 81 in tangential contact with the smooth circumferential face of pulley 80 and attached to the inner end 83 of contact rod 50. Preferably pulley 80 is provided with a V groove 85 and propulsion rod 81 is of V-shaped cross section whereby its opposite angular surfaces 86 and 87 are in flatwise contact with the corresponding surfaces 88 and 89 of V groove 85. Preferably also the groove contacting portion of propulsion rod 81 is of sponge rubber or the like, as at 90, and is backed by a resilient metal leaf spring as at 91, the latter being vertical but bent inwardly at its lower end 94 for attachment to end 83 of rod 50 by screws 95.

The resiliency of friction propulsion rod 81, is such that in the absence of the pulley 80 and shaft 42, it would assume a normal position bent over to the left as Fig. 1 is viewed. When flexed backwardly, or to the right in Fig. 1, into the position shown in dotted lines, it is thus gently urged at all times by its resiliency into a friction contact with the grooved pulley 80.

Since the dial 29 and lens 32 are inset in a plane in rear of the plane of front edge 30 of bezel 26 and the motion transmitting means B is simple and made up of rubber or resilient parts, there is little opportunity for breakage in the event of sudden impact. If the contact point 51 receives a sudden impact the friction propulsion rod 81 merely slips past the pulley 80 without damaging the same and then immediately resumes its frictional contact therewith.

As best shown in Fig. 5, a pair of grooves 33 are provided in bezel 26, each accommodating a split ring such as 100 to hold lens 32 in place. A plurality of complementary pairs of grooves such as 96 and 97 are formed in the exterior of body member 21 and the interior of bezel 26, each pair of grooves having a small bowed leaf spring 93 therein to hold the bezel 26 in place. Holes such as 194 are provided in bezel 26, through which a sharp instrument may be passed to flatten each spring 93 for removal of bezel 26. A set screw 98 may also be provided for locking the bezel 26 against rotating and a leaf spring 99 enters a slot 101 in the dial 29 to cause the dial 29 to rotate with bezel 26. Springs 93 act as tension springs to control the turning of the bezel 26, and to control the turning of the dial. It should be noted that the propulsion rod 81 is fixed at its base to the inner end 83 of contact rod 50 and that the free end of the propulsion rod 81 is held against pulley 80 only by its own inherent resiliency. It should also be noted that propulsion rod 81 is movable by contact rod 50 only along a fixed longitudinal axis and only rectilinearly in response to the rectilinear axial movement of the rod 50 in stem 22.

I claim:

1. A portable gauge for indicating pressure on a contact point, said gauge comprising a hollow cylindrical body member; a dial having spaced visual indications aligned in the path of an indicator needle pointer; said dial being located in an intermediate radial plane of said body member; a narrow elongated indicator needle mounted to traverse said dial and having a pointer for following said line of visual indications; an indicator needle shaft, fixed to said indicator needle, and extending axially through said dial into said body; a needle shaft support within said body having spaced apart bearings for rotatably supporting said needle shaft at spaced apart points; a contact rod having a contact point extending outside said body member, said rod being slidably mounted on said gauge to move rectilinearly in a plane perpendicular to the axial direction of said shaft; a V grooved pulley mounted between said bearings on said shaft; a substantially straight, resilient propulsion rod fixed to the inner end of said contact rod to move only rectilinearly therewith and a sponge rubber strip fixed to one face of said resilient rod and of V shaped cross section, said strip being in tangential frictional engagement with said pulley groove.

2. A portable gauge for indicating pressure on a contact point, said gauge comprising a hollow cylindrical body member having a hollow stem extending perpendicular to the circumferential surface thereof; a contact rod, having a contact point, said rod being rectilinearly slideable in said stem; a needle shaft rotatably supported axially of said cylindrical body member and having an indicator needle thereon, an indicator dial in said body adapted to be traversed by said needle; a smooth faced pulley on said needle shaft and a flexible spring propulsion rod, of inherently resilient material, said rod having a base portion fixed to said contact rod for rectilinear movement therewith and being free and unsupported throughout its length except for an elongated smooth face in frictional resilient engagement with the smooth circumferential face of said pulley.

3. A combination as specified in claim 2 wherein the free portion of said propulsion rod when unflexed is bent out of parallelism with said contact rod but when flexed and in engagement with said pulley is in parallelism therewith, whereby said rod is continually urged against said pulley by the inherent resiliency thereof.

4. A combination as specified in claim 2 wherein said propulsion rod comprises a metal leaf spring having a strip of resilient sponge-like material therealong and adapted to engage the smooth circumferential face of said pulley.

References Cited in the file of this patent

UNITED STATES PATENTS

| | | |
|---|---|---|
| 49,073 | Bowker | Aug. 1, 1865 |
| 686,455 | Hill | Nov. 12, 1901 |
| 1,279,703 | James | Sept. 24, 1918 |
| 1,361,848 | Green | Dec. 14, 1920 |
| 1,966,424 | Ames | July 17, 1934 |
| 2,046,661 | Straus | July 7, 1936 |
| 2,210,435 | Ruf | Aug. 6, 1940 |
| 2,323,740 | Wagner | July 6, 1943 |
| 2,346,578 | Haskins | Apr. 11, 1944 |
| 2,432,006 | Haferl | Dec. 2, 1947 |
| 2,444,021 | Oakley | June 22, 1948 |

FOREIGN PATENTS

| | | |
|---|---|---|
| 1,853 | Great Britain | May 9, 1879 |
| 138,295 | Switzerland | May 1, 1930 |
| 890,470 | France | Nov. 2, 1943 |
| 642,723 | Great Britain | Sept. 13, 1950 |